United States Patent
Rotker et al.

(10) Patent No.: US 11,842,546 B2
(45) Date of Patent: Dec. 12, 2023

(54) SENSOR FUSION-BASED TOP-VIEW THREE-DIMENSIONAL STIXEL REPRESENTATION FOR GENERAL OBSTACLE DETECTION IN A VEHICLE

(71) Applicant: GM Global Technology Operations LLC, Detroit, MI (US)

(72) Inventors: Keren Rotker, Tel-Aviv (IL); Max Bluvstein, Nahariya (IL); Bat El Shlomo, Tel-Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 331 days.

(21) Appl. No.: 17/319,570

(22) Filed: May 13, 2021

(65) Prior Publication Data
US 2022/0366176 A1    Nov. 17, 2022

(51) Int. Cl.
| | |
|---|---|
| *G06V 20/58* | (2022.01) |
| *B60W 60/00* | (2020.01) |
| *G06N 3/08* | (2023.01) |
| *G06F 18/25* | (2023.01) |

(52) U.S. Cl.
CPC ........... *G06V 20/58* (2022.01); *B60W 60/001* (2020.02); *G06F 18/25* (2023.01); *G06N 3/08* (2013.01); *B60W 2420/42* (2013.01); *B60W 2554/4049* (2020.02)

(58) Field of Classification Search
None
See application file for complete search history.

(56) References Cited

U.S. PATENT DOCUMENTS

| | | | | |
|---|---|---|---|---|
| 11,579,629 | B2 * | 2/2023 | Wu | G06V 20/56 |
| 2018/0182113 | A1 * | 6/2018 | Kimura | G08G 1/16 |
| 2019/0294896 | A1 * | 9/2019 | Jia | G06V 10/454 |
| 2020/0158856 | A1 * | 5/2020 | Becker | G01S 13/867 |
| 2020/0160559 | A1 * | 5/2020 | Urtasun | G06T 7/75 |
| 2022/0210305 | A1 * | 6/2022 | Feng | H04N 23/62 |
| 2022/0357186 | A1 * | 11/2022 | Dharia | G06V 10/25 |

FOREIGN PATENT DOCUMENTS

DE       102017116017  A1  *  1/2019

OTHER PUBLICATIONS

RGB-D Data Fusion in Complex Space. Cai et al. (Year: 2017).*
Particle Grid Tracking System Stereovision Based Obstacle Perception in Driving Environments. Danescu et al (Year: 2012).*
Robust Virtual Scan for Obstacle Detection in Urban Environments. Mengwen et al. (Year: 2016).*
Real-Time Obstacle Detection using Stereo Vision for Autonomous Ground Vehicles: A Survey. Bernini et a. (Year: 2014).*

* cited by examiner

*Primary Examiner* — Delomia L Gilliard
(74) *Attorney, Agent, or Firm* — CANTOR COLBURN LLP

(57) ABSTRACT

A system in a vehicle includes a first sensor to obtain first sensor data from a first field of view and provide a first top-view feature representation. The system also includes a second sensor to obtain second sensor data from a second field of view with an overlap with the first field of view and provide a second top-view feature representation. Processing circuitry implements a neural network and provides a top-view stixel representation based on the first top-view feature representation and the second top-view feature representation. The top-view three-dimensional stixel representation is used to control an operation of the vehicle.

18 Claims, 2 Drawing Sheets

SENSOR FUSION-BASED TOP-VIEW THREE-DIMENSIONAL STIXEL REPRESENTATION FOR GENERAL OBSTACLE DETECTION IN A VEHICLE

INTRODUCTION

The subject disclosure relates to a sensor fusion-based top-view three-dimensional (3D) stixel representation for general obstacle detection in a vehicle.

Vehicles (e.g., automobiles, trucks, construction equipment, farm equipment, automated factory equipment) increasingly include sensors to obtain information about the vehicle and its environment. Information about the environment around the vehicle facilitates autonomous or semi-autonomous operation. Exemplary semi-autonomous operation includes automatic braking, adaptive cruise control, and collision avoidance. Exemplary sensors that provide information about the environment around the vehicle include radio detection and ranging (radar) systems, light detection and ranging (lidar) systems, and cameras. While object detection using one or more sensors typically entails identification of the type of an object (e.g., automobile), general obstacle detection refers to the detection of a general (un-identified) structure and, put another way, the identification of free space without any objects. The identification of free space facilitates a determination of where the vehicle may navigate. Accordingly, it is desirable to provide a sensor fusion-based top-view 3D stixel representation for general obstacle detection in a vehicle.

SUMMARY

In one exemplary embodiment, a system in a vehicle includes a first sensor to obtain first sensor data from a first field of view and to provide a first top-view feature representation. The system also includes a second sensor to obtain second sensor data from a second field of view with an overlap with the first field of view and provide a second top-view feature representation. Processing circuitry implements a neural network and provides a top-view three-dimensional stixel representation based on the first top-view feature representation and the second top-view feature representation. The top-view three-dimensional stixel representation is used to control an operation of the vehicle.

In addition to one or more of the features described herein, the first sensor is a camera and the first sensor data is two-dimensional images.

In addition to one or more of the features described herein, the second sensor is a lidar system and the second sensor data is three-dimensional.

In addition to one or more of the features described herein, the second sensor is a radar system and the second sensor data is three-dimensional.

In addition to one or more of the features described herein, a first neural network provides the first top-view feature representation based on the first sensor data and a second neural network provides the second top-view feature representation based on the second sensor data.

In addition to one or more of the features described herein, the processing circuitry fuses the first top-view feature representation and the second top-view feature representation to obtain a fused top-view feature representation using a third neural network.

In addition to one or more of the features described herein, the processing circuitry converts the fused top-view feature representation to a polar coordinate system to obtain a fused top-view three-dimensional stixel representation. Each stixel of the top-view three-dimensional stixel representation is encoded with values of two or more attributes.

In addition to one or more of the features described herein, the processing circuitry performs general obstacle detection based on the fused top-view three-dimensional stixel representation using a neural network.

In addition to one or more of the features described herein, the two or more attributes include distance to an object detected based on the general obstacle detection and height of the object.

In addition to one or more of the features described herein, the two or more attributes include a type, appearance, or color of the object detected based on the general obstacle detection.

In another exemplary embodiment, a method includes obtaining a first top-view feature representation based on first sensor data from a first field of view of a first sensor in a vehicle. The method also includes obtaining a second top-view feature representation based on second sensor data from a second sensor in the vehicle with a second field of view with an overlap with the first field of view. A neural network is implemented to provide a top-view three-dimensional stixel representation based on the first top-view feature representation and the second top-view feature representation. The top-view three-dimensional stixel representation is used to control an operation of the vehicle.

In addition to one or more of the features described herein, the first sensor is a camera and the first sensor data is two-dimensional images.

In addition to one or more of the features described herein, the second sensor is a lidar system and the second sensor data is three-dimensional.

In addition to one or more of the features described herein, the second sensor is a radar system and the second sensor data is three-dimensional.

In addition to one or more of the features described herein, the method also includes providing, using a first neural network, the first top-view feature representation based on the first sensor data and providing, with a second neural network, the second top-view feature representation based on the second sensor data.

In addition to one or more of the features described herein, the method also includes fusing, using the processing circuitry, the first top-view feature representation and the second top-view feature representation to obtain a fused top-view feature representation using a third neural network.

In addition to one or more of the features described herein, the method also includes converting, using the processing circuitry, the fused top-view feature representation to a polar coordinate system to obtain a fused top-view three-dimensional stixel representation, each stixel of the top-view three-dimensional stixel representation being encoded with values of two or more attributes.

In addition to one or more of the features described herein, the method also includes performing, using the processing circuitry, general obstacle detection based on the fused top-view three-dimensional stixel representation using a neural network.

In addition to one or more of the features described herein, the two or more attributes include distance to an object detected based on the general obstacle detection and height of the object.

In addition to one or more of the features described herein, the two or more attributes include a type, appearance, or color of the object detected based on the general obstacle detection.

BRIEF DESCRIPTION OF THE DRAWINGS

The above features and advantages, and other features and advantages of the disclosure are readily apparent from the following detailed description when taken in connection with the accompanying drawings.

Other features, advantages and details appear, by way of example only, in the following detailed description, the detailed description referring to the drawings in which.

DETAILED DESCRIPTION

Figure 1:
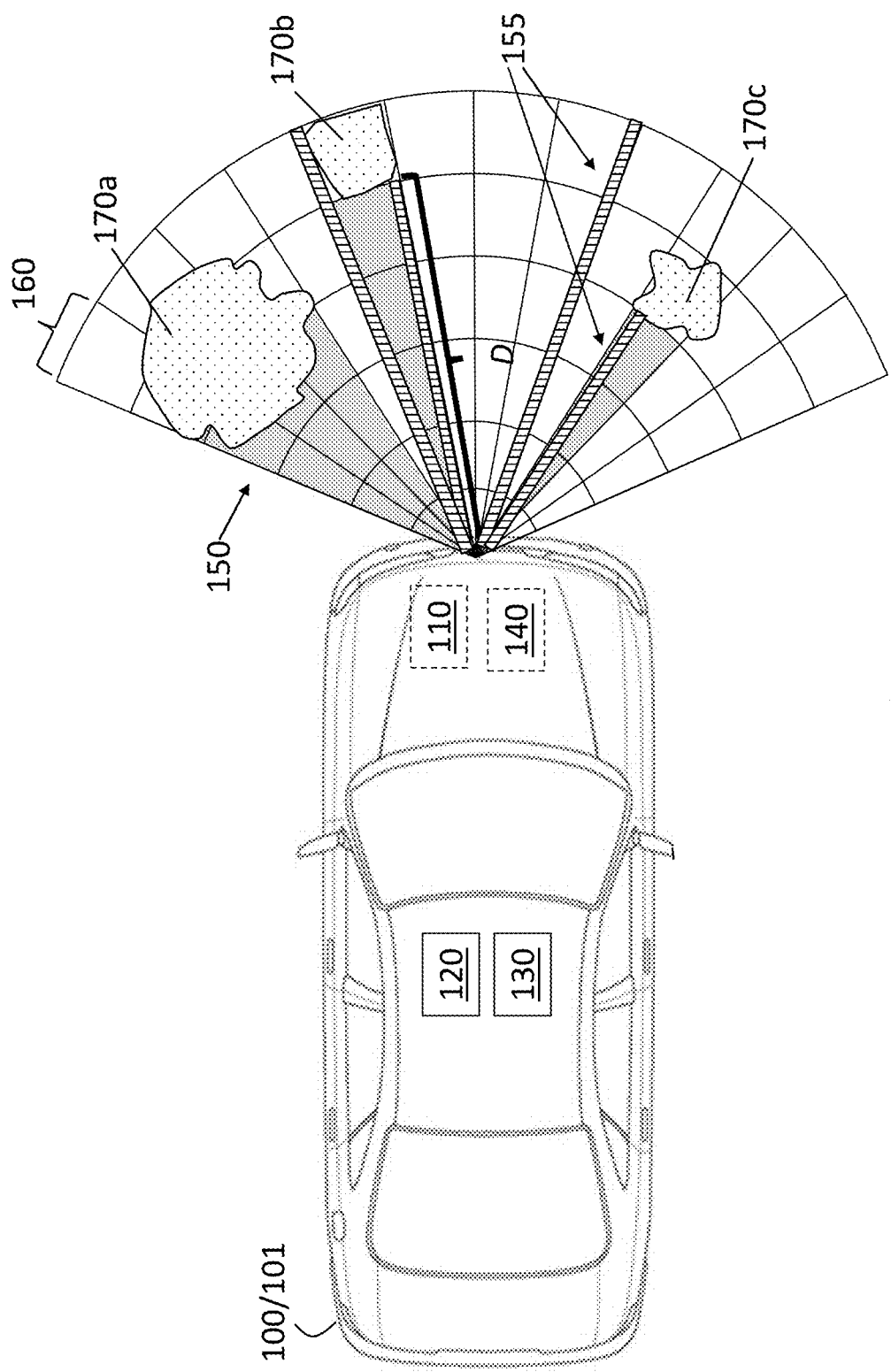
FIG. 1 is a block diagram of a vehicle that obtains a sensor fusion-based top-view three-dimensional stixel representation for general obstacle detection.

The following description is merely exemplary in nature and is not intended to limit the present disclosure, its application or uses. It should be understood that throughout the drawings, corresponding reference numerals indicate like or corresponding parts and features.

As previously noted, sensors provide information about the environment around a vehicle and facilitate autonomous or semi-autonomous operation of the vehicle. The information may alternately or additionally be used to provide warnings to a driver. As also noted, general obstacle detection refers to the detection of road obstacles of any structure and class that are seen as general structures for purposes of identifying free space (i.e., areas without any of the objects) which the vehicle may traverse. A prior approach involves using a stixel representation based on a camera image for general obstacle detection. According to that approach, each stixel represents a column in the image (e.g., red green blue (RGB) image) and the length of each stixel is proportional to a number of pixels between the bottom of the image and an obstacle in the image or the top of the image in areas of the image without any obstacle. Thus, the length of a stixel indicates the free space from the camera position to a given obstacle on the two-dimensional (2D) image plane. Because the representation does not include any prior assumption regarding the structure and/or appearance of any obstacle, it is well-suited to general obstacle detection. However, the 2D stixel representation does not convey any 3D or depth information. In addition, while a camera image provides high spatial resolution, other sensors (e.g., lidar system) are more accurate and provide additional 3D information.

Embodiments of the systems and methods detailed herein relate to a sensor fusion-based top-view 3D stixel representation for general obstacle detection in a vehicle. Features are extracted from the data that is obtained with two or more sensors (e.g., camera, radar system, lidar system), and then transformed to a top-view representation (i.e., bird's eye view). The transformed features are then fused together to represent the aggregated features from all sensors in a top-view representation. The transformation of information from each sensor to the top-view facilitates a sensor agnostic approach and allows any number of sensors to be fused. The top-view representation of the fused features is converted to a polar coordinate system. This conversion results in a stixel representation that originates at a center of the polar coordinate system (e.g., some point on the vehicle). More specifically, based on one or more of the fused sensors providing three-dimensional information, this conversion results in a top-view three-dimensional stixel representation that indicates (i.e., is encoded with) attributes such as distance and height. The stixel representation makes general obstacle detection straight-forward, as detailed.

In accordance with an exemplary embodiment, FIG. 1 is a block diagram of a vehicle 100 that obtains a sensor fusion-based top-view 3D stixel representation 150 for general obstacle detection. The exemplary vehicle 100 shown in FIG. 1 is an automobile 101. The vehicle 100 is shown to include a camera 110, a lidar system 120, and a radar system 130. The numbers and locations of sensors in the vehicle 100 are not limited by the exemplary illustration. The vehicle 100 also includes a controller 140 that may obtain information from one or more sensors to control an aspect of the operation of the vehicle 100. The controller 140 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

According to one or more embodiments, the controller 140 obtains a sensor fusion-based top-view 3D stixel representation 150 to perform general obstacle detection. Aspects of an exemplary top-view 3D stixel representation 150 are shown for explanatory purposes. The exemplary top-view 3D stixel representation 150 facilitates detection of objects 170a, 170b, and 170c (generally referred to as 170) as detailed herein. In FIG. 1, some of the stixels 155 that make up the top-view stixel representation 150 are indicated. As detailed, the top-view 3D stixel representation 150 is in the polar coordinate system. As previously noted, stixel representation refers to information being encoded in each stixel 155. For example, distance D to and height of an object 170 (a closest point of the object 170 from the vehicle 100) encountered by the stixel 155 may be attributes that are encoded. The length of an exemplary stixel 155 to the exemplary object 170b is indicated. As indicated, the length of the stixel 155 from the center of the polar coordinate system (e.g., center of the front grill of the vehicle 100) indicates the distance D, which is the range to the object 170 from the vehicle 100. Each angular slice 160 of the top-view stixel representation 150 is indicated. Each angular slice 160 is associated with a vector of information based on the stixels 155 that make up the angular slice 160.

As detailed, a feature of the top-view 3D stixel representation 150 is that the range (i.e., distance D) to an object 170 is encoded as a length of a stixel 155 from the vehicle 100 (e.g., the center of the front grill, which is taken as the center of the polar coordinate system) to the object 170. Other attributes (e.g., height of the object 170) are also encoded. Thus, general obstacle detection for purposes of determining where the vehicle 100 may travel is made straight-forward by the top-view 3D stixel representation 150. As also detailed, another feature of the top-view 3D stixel representation 150 is fusion of the data provided by two or more sensors. For example, the camera 110 provides relatively high spatial resolution but poor depth perception as compared with a lidar system 120 or a radar system 130, but the lidar system 120 or radar system 130 provide three-dimensional accurate measurements. The fusion of the camera 110 with the lidar system 120 or radar system 130, for example, provides the spatial resolution of the camera 110 with the accuracy and additional information (e.g., height of and range to an object 170) from the lidar system 120 or the radar system 130.

Figure 2:
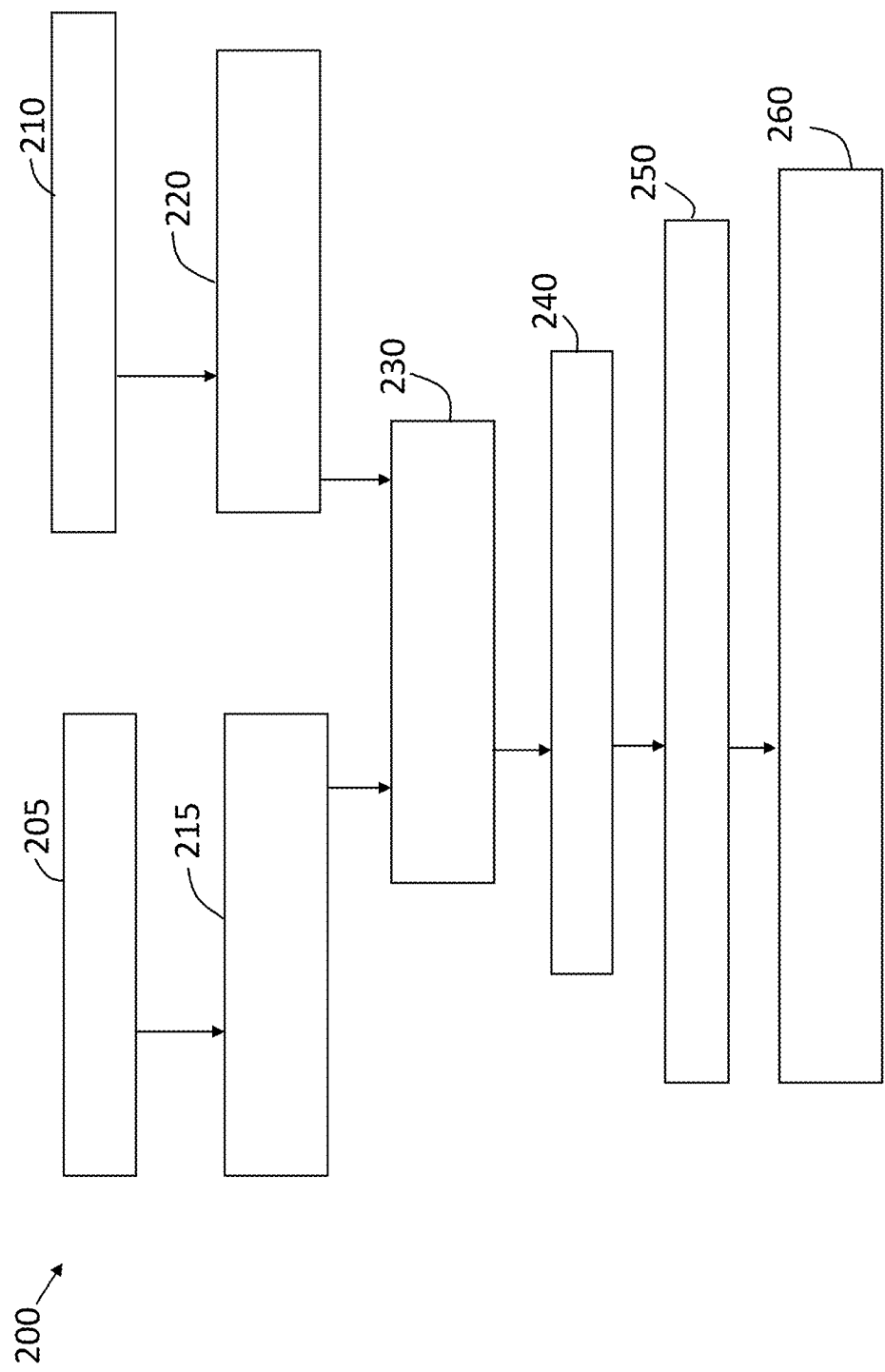
FIG. 2 is a process flow of a method of obtaining a sensor fusion-based top-view three-dimensional stixel representation for general obstacle detection in a vehicle according to one or more embodiments.

FIG. 2 is a process flow of a method 200 of obtaining a sensor fusion-based top-view 3D stixel representation 150 for general obstacle detection in a vehicle 100 according to one or more embodiments. At block 205, obtaining data from a first sensor refers to obtaining first sensor data. According to an exemplary embodiment, the first sensor may be the camera 110 and the first sensor data may be two-dimensional images obtained with the camera 110. At block 210, obtaining data from a second sensor refers to obtaining second sensor data. According to an exemplary embodiment, the second sensor may be the lidar system 120 and the second sensor data may be a lidar point cloud. According to an alternate embodiment or an additional embodiment, the second sensor or an additional sensor may be the radar system 130 and the second sensor data or additional sensor data may be a radar point cloud.

At block 215, processing the first sensor data results in a top-view feature representation referred to as a first top-view feature representation for explanatory purposes. The processing may be performed by a known convolutional neural network that extracts features from the first sensor data (e.g., look-ahead images provided by the camera 110) at each convolutional level of the neural network and transforms the features to bird's eye (i.e., top-view) representations. The neural network may be trained in an end-to-end manner. The resulting first top-view feature representation obtained from the first sensor data may be in the Euclidean coordinate system.

At block 220, processing the second sensor data results in a top-view feature representation referred to as a second top-view feature representation for explanatory purposes. The processing may be performed similarly to the processing discussed with reference to block 215. That is, a known convolutional neural network, trained in an end-to-end manner, may extract features from the second sensor data (e.g., lidar point cloud or radar point cloud) and transform the extracted features to bird's eye (i.e., top-view) representations. Like the first top-view feature representation, the second top-view feature representation may be in the Euclidean coordinate system. As previously noted, the radar point cloud may be transformed additionally rather than alternately.

At block 230, fusing the top-view feature representations refers to performing a fusion of the first top-view feature representation (from block 215) and the second top-view feature representation (from block 220). Additional top-view feature representations may also be fused if available. The fusion may be performed by a neural network. Because the first top-view feature representation, the second top-view feature representation, and, when available, the additional top-view feature representations are all in the same (Euclidean) coordinate system, the fusion is straight-forward and sensor agnostic. That is, the architecture of the neural network performing the fusion need not be modified or customized based on the position and field of view of the sensors being fused because, at the point in the processing in which fusion is performed, the feature representations from all sensors are transformed to the same top-view Euclidean format. At block 240, the processes include converting the fused top-view feature representations to the polar coordinate system. The vehicle 100 (e.g., the center of the front grill) may be the center of the polar coordinate system. The result of the processes at block 240 is a sensor fusion-based top-view 3D stixel representation 150 that facilitates general obstacle detection.

Then, at block 250, general obstacle detection is performed using a neural network acting on the top-view 3D stixel representation 150 obtained at block 240. A deep convolutional neural network may be used to identify the positions of objects 170, the range to each object 170, the height of each object 170, and other attributes (e.g., type, color, appearance) based on the stixels 155. As previously noted, objects 170 are detected as general structures (i.e., obstacles). During training of the neural network used at block 250, ground truth data regarding each object 170 is annotated by a stixel representation that generalizes the object detection categorical tasks to any obstacles intersecting a road. Obstacles may be static or dynamic, bounded or unbounded, and of any type and category. As previously noted, each stixel 155 representation indicates (i.e., is encoded with) attributes such as distance D from a center of the polar coordinate system to an encountered object 170 and height of the object 170 at the point that the stixel 170 encounters it.

As also previously noted, the polar coordinate system facilitates division of the field of view into angular slices 160. Thus, the angular slice 160 in which an object 160 is represented indicates angular position relative to the vehicle 100. As also previously noted, each angular slice 160 is associated with a vector of information based on the attributes embedded in each stixel 155 within the angular slice 160. Exemplary attributes encoded in the stixel representation include distance D and height, as well as type, appearance, and color of an object 170 detected within the angular slice 160. The general object detection that is facilitated by the top-level 3D stixel representation 150 results in an indication of the free space between the vehicle 100 and the object 170. In addition, the angular slices 160 without objects 170 (i.e., with free space) are apparent based on the top-view stixel representation 150.

At block 260, the processes include controlling vehicle operation based on the general obstacle detection that is based on the top-view 3D stixel representation 150. The general obstacle detection that is facilitated by the top-view 3D stixel representation 150 allows the vehicle controller 140 to know the position, range, and height of each object 170 and may additionally indicate other attributes, as well. As a result, the controller 140 may perform path determination within the free space that does not include any object 170 or autonomous braking prior to reaching any object 170, for example.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle, the system comprising:
a first sensor configured to obtain first sensor data from a first field of view and provide a first top-view feature representation;
a second sensor configured to obtain second sensor data from a second field of view with an overlap with the first field of view and provide a second top-view feature representation; and
processing circuitry configured to implement a neural network and to:

provide a top-view three-dimensional stixel representation based on the first top-view feature representation and the second top-view feature representation, wherein the top-view three-dimensional stixel representation is used to control an operation of the vehicle;

fuse the first top-view feature representation and the second top-view feature representation;

convert the fused top-view feature representation to a polar coordinate system to obtain a fused top-view three-dimensional stixel representation, each stixel of the top-view three-dimensional stixel representation being encoded with values of two or more attributes; and perform general obstacle detection based on the fused top-view three-dimensional stixel representation using a neural network, wherein the two or more attributes include distance to an object detected based on the general obstacle detection and height of the object.

2. The system according to claim 1, wherein the first sensor is a camera and the first sensor data is two-dimensional images.

3. The system according to claim 2, wherein the second sensor is a lidar system and the second sensor data is three-dimensional.

4. The system according to claim 2, wherein the second sensor is a radar system and the second sensor data is three-dimensional.

5. The system according to claim 1, wherein a first neural network provides the first top-view feature representation based on the first sensor data and a second neural network provides the second top-view feature representation based on the second sensor data.

6. The system according to claim 1, wherein the two or more attributes include a type, appearance, or color of the object detected based on the general obstacle detection.

7. A method, comprising:

obtaining, using processing circuitry, a first top-view feature representation based on first sensor data from a first field of view of a first sensor in a vehicle;

obtaining, using the processing circuitry, a second top-view feature representation based on second sensor data from a second sensor in the vehicle with a second field of view with an overlap with the first field of view;

implementing, using the processing circuitry, a neural network and providing a top-view three-dimensional stixel representation based on the first top-view feature representation and the second top-view feature representation, wherein the top-view three-dimensional stixel representation is used to control an operation of the vehicle;

fusing, using the processing circuitry, the first top-view feature representation and the second top-view feature representation;

converting, using the processing circuitry, the fused top-view feature representation to a polar coordinate system to obtain a fused top-view three-dimensional stixel representation, each stixel of the top-view three-dimensional stixel representation being encoded with values of two or more attributes; and performing, using the processing circuitry, general obstacle detection based on the fused top-view three-dimensional stixel representation using a neural network, wherein the two or more attributes include distance to an object detected based on the general obstacle detection and height of the object.

8. The method according to claim 7, wherein the first sensor is a camera and the first sensor data is two-dimensional images.

9. The method according to claim 8, wherein the second sensor is a lidar system and the second sensor data is three-dimensional.

10. The method according to claim 8, wherein the second sensor is a radar system and the second sensor data is three-dimensional.

11. The method according to claim 7, further comprising providing, using a first neural network, the first top-view feature representation based on the first sensor data and providing, with a second neural network, the second top-view feature representation based on the second sensor data.

12. The method according to claim 7, wherein the two or more attributes include a type, appearance, or color of the object detected based on the general obstacle detection.

13. A vehicle, comprising:

a first sensor configured to obtain first sensor data from a first field of view and provide a first top-view feature representation;

a second sensor configured to obtain second sensor data from a second field of view with an overlap with the first field of view and provide a second top-view feature representation; and processing circuitry configured to implement a neural network and to:

provide a top-view three-dimensional stixel representation based on the first top-view feature representation and the second top-view feature representation, wherein the top-view three-dimensional stixel representation is used to control an operation of the vehicle;

fuse the first top-view feature representation and the second top-view feature representation;

convert the fused top-view feature representation to a polar coordinate system to obtain a fused top-view three-dimensional stixel representation, each stixel of the top-view three-dimensional stixel representation being encoded with values of two or more attributes; and perform general obstacle detection based on the fused top-view three-dimensional stixel representation using a neural network, wherein the two or more attributes include distance to an object detected based on the general obstacle detection and height of the object.

14. The vehicle according to claim 13, wherein the first sensor is a camera and the first sensor data is two-dimensional images.

15. The vehicle according to claim 14, wherein the second sensor is a lidar system and the second sensor data is three-dimensional.

16. The vehicle according to claim 14, wherein the second sensor is a radar system and the second sensor data is three-dimensional.

17. The vehicle according to claim 13, wherein a first neural network provides the first top-view feature representation based on the first sensor data and a second neural network provides the second top-view feature representation based on the second sensor data.

18. The vehicle according to claim 13, wherein the two or more attributes include a type, appearance, or color of the object detected based on the general obstacle detection.

* * * * *